Figure 1:
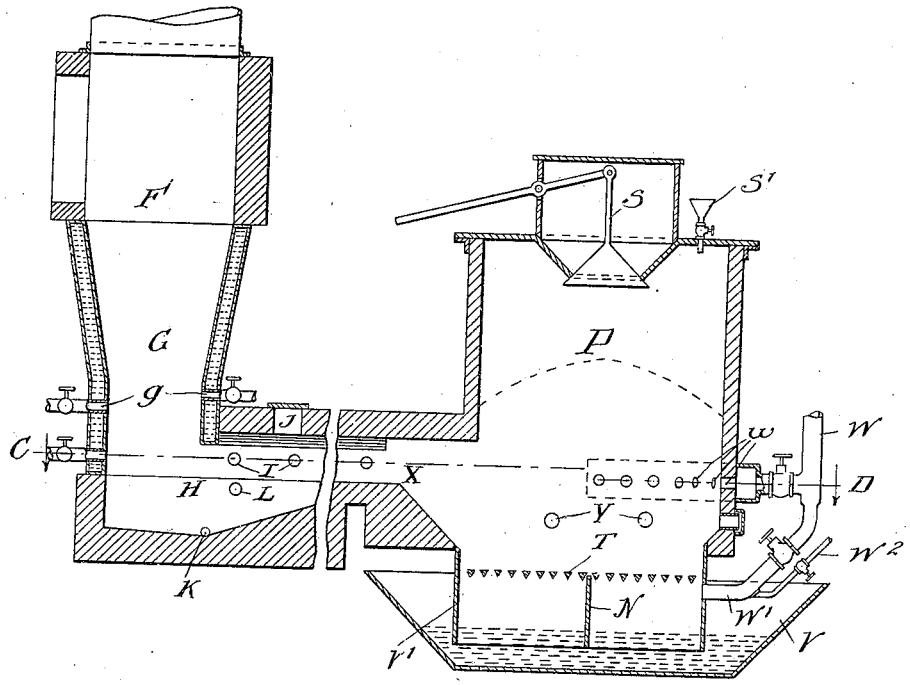

No. 841,212. PATENTED JAN. 15, 1907.
W. H. ADAMS & F. POWELL.
COMBINED GAS GENERATOR AND SMELTER.
APPLICATION FILED JULY 16, 1904.

Witnesses:
Wm. Geiger

Inventors.
William H. Adams
Frederick Powell
By Munday, Evarts & Adcock,
Attorneys

UNITED STATES PATENT OFFICE.

WILLIAM H. ADAMS AND FREDERICK POWELL, OF PORTLAND, OREGON, ASSIGNORS OF TWENTY-FIVE ONE-HUNDREDTHS TO SAID ADAMS, FIFTEEN ONE-HUNDREDTHS TO SAID POWELL, AND SIXTY ONE-HUNDREDTHS TO THE LADD METALS COMPANY, A CORPORATION OF OREGON.

COMBINED GAS-GENERATOR AND SMELTER.

No. 841,212.

Specification of Letters Patent.

Patented Jan. 15, 1907.

Application filed July 16, 1904. Serial No. 216,799.

*To all whom it may concern:*

Be it known that we, WILLIAM H. ADAMS and FREDERICK POWELL, citizens of the United States, residing in Portland, in the county of Multnomah and State of Oregon, have invented a new and useful Improvement in a Combined Gas-Generator and Smelter, of which the following is a specification.

Our invention consists of an apparatus for the smelting of ores, particularly those requiring a high temperature for their reduction or for their fusion.

In the common practice of smelting in stack or upright furnaces the ore fluxes and fuel are introduced at or near the top of the furnace. Air is introduced through a number of twyers through the walls of the furnace near the bottom, and fusion takes place as a result of the combustion of the fuel in immediate contact with the ore. Reduction of oxids to metallic form, as in iron smelting, or oxidation of certain elements, such as sulfur, in copper-smelting take place according to the relative quantity of fuel, the height of the furnace, and the amount of air introduced.

Economy in smelting means the smelting of the greatest number of pounds of ore with the smallest amount of fluxes and fuel. In the effort to reduce the fuel to the lowest possible percentage a small margin of safety is sometimes allowed. The result of this is that a slight change in the character or composition of the ore or carelessness on the part of the feeder may cause the furnace to "freeze." This means that there is not sufficient fuel in the furnace at the fusion zone to melt the charge or make a fluid slag. As this fusion zone is near the twyers at the bottom of the furnace and the only way to get fuel into the furnace is through the top, there is no remedy but to increase the fuel at the top in the hope that the furnace will keep working long enough for this to get down to the right spot before the freeze-up becomes a fact and the furnace has to be cleaned out and started anew.

The principal improvement heretofore introduced tending to reduce the fuel required and at the same time keep the furnace hot at the bottom is the hot blast. The air is heated before it enters the furnace. This is common practice in iron-smelting and has recently been introduced in copper-smelting with beneficial results.

One serious difficulty smelters have to contend with is the loss of fine particles of ore blown out of the furnace mechanically by the blast. This makes the smelting of fine ores in a stack impracticable unless they are first briqueted. In large plants the flue-dust and fine ore are smelted in reverberatories or briqueted and returned to the stack. In small plants, where the additional furnace is not practicable for some reason, the loss in dust is a serious item or briqueting a serious expense.

One indispensable requisite for smelting in a stack-furnace by the present practice is coke as fuel. Reverberatory furnaces are fired with coal or wood. In many localities the cost of coke or coal is prohibitory and the available wood is of such poor quality that smelting is economically impossible when grate-fires are used.

Our invention consists in an improvement in smelting-furnaces whereby the difficulties met with in smelting as commonly practiced are overcome. In our invention coal or wood is used as a fuel, and the freezing up of a furnace, due to exhaustion of the fuel before it descends to the fusion zone, is impossible.

The item of fluxes may also be materially reduced, because, owing to the manner in which the air and fuel are introduced, a higher temperature can be secured at the bottom of the furnace than by any method at present in use. A much more silicious or otherwise difficultly-fused slag can therefore be run with safety, which means less fluxes.

In our apparatus the greater part of the fuel is converted into gas before its introduction into the furnace, and when introduced it enters at the bottom instead of the top. The greatest heat is therefore insured at the proper place, and a freeze-up is practically impossible.

In our form of apparatus a means is provided by which flue-dust and fine ore may be introduced at the bottom of the furnace instead of the top, thus subjecting them to a smelting heat where they cannot be blown out of the furnace.

Figure 2:
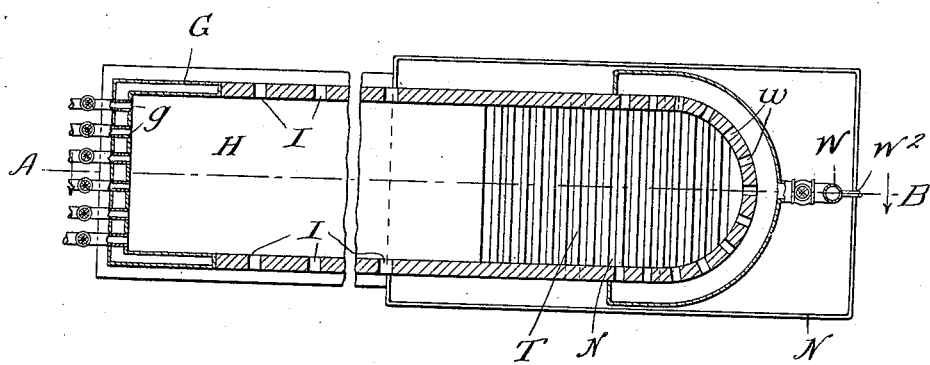

Referring to the drawings, in which Figure 1 is a vertical section on the line A B of Fig. 2, and Fig. 2 is a horizontal section on the line C D of Fig. 1, F is a furnace-stack of the type common in smelting copper ores. The lower portion is composed of steel water-jackets G, having openings $g$ for the admission of air under pressure, as in ordinary practice. H is the hearth or crucible of the furnace, which is extended on one side beyond the jacket of the stack. This extension is covered with an arch of fire-brick, thus forming a flue which, in effect, is a reverberatory hearth connecting with the generator P.

We prefer the form of gas-generator shown, because it is especially adapted to our method of smelting, for the reason that it is capable of delivering hot gas into the furnace under any pressure desired.

Openings for the admission of air I I are provided, through which any desired amount of air is forced into the flue or hearth H, securing combustion of any desired portion of the gas before entering the stack.

J is an opening through which fine ore is introduced.

K is a tap-hole for removing metal or matte.

L is a tap-hole for slag.

The generator-chamber P is preferably elliptical in form and is elongated at the base just above the grate T, so as to form an increased area at the zone of incandescence. In this manner we insure an additional mass of fuel in this zone, which we find desirable to thoroughly decompose and fix the products of combustion and the volatile elements of the fuel. The fuel is admitted to the chamber by the feed device S, the operation of which will be understood.

S' represents a valved feeder through which liquid hydrocarbons may be admitted to the generator for enriching the gas.

A water-seal ash-pan is shown at V, and W is the air-pipe, connected with a fan or pump, whereby a pressure-blast may be created through it. Air is admitted to the chamber of the generator through the ports $w$.

X is the outlet through which the gas enters the reverberatory hearth or flue, and, as shown, it is located below the top of the fuel and in line with the zone of incandescence, so that said zone is confined to the lower portion of the fuel, and as the body of the fuel is long horizontally the gas generated in the anterior portion of the zone cannot escape at the outlet before it has been thoroughly decomposed.

W' is an additional air-inlet for supplying air to the bottom of the grate below the ports $w$.

N is a vertical diaphragm placed transversely across the bottom of the generator below the grate and extending downward into the water in the ash-pan. It forms a close junction at its ends with the depending skirt V', which surrounds the grate-space and extends down into the water of the ash-pan, so that the diaphragm is enabled to limit the area of the grate through which air supplied by the inlet W' may have access to the grate. The skirt, in connection with the ash-pan, effects the water seal and prevents the escape of such air as is admitted by the air-inlet above described. Steam may also be admitted through the inlet W' by means of the steam-pipe $W^2$.

Y represents poke-holes.

It will be understood that the air is introduced into the furnace under pressure from a blower, as in common practice in smelting, and that the gas-producer is operated with forced blast from an independent blower, giving a pressure slightly in excess of that of the furnace-blast.

Our method of smelting, carried on in an apparatus substantially of the form described, is as follows: The gas-generator is first started, using either wood or coal, it being understood that if wood is to be burned the generator is required to be somewhat larger than for coal. A sufficient amount of air is admitted in the hearth through the openings I I to burn the gas. If the hearth is new and cold, a fire of wood must be started in it to secure the ignition of the gas. Then a quantity of wood cut to about the size of ordinary stove-wood—that is, twelve to sixteen inches long and from six to eight inches thick—is introduced into the stack sufficient to fill it somewhat above the twyers, and the blast is turned on at this point. This fuel is immediately ignited by the gas-flame. Lump-coal (or wood) is now introduced sufficient to fill the stack about half-full. After this is thoroughly ignited ore fluxes and fuel are charged in regular order. If coal is used, lumps only are used in the stack, the fine portion going to the gas-generator. If wood is used, it should be cut up as described. In either case the chief object of the fuel in the stack is to keep the ore from fusing into a mass, that would obstruct the passage of the gas and the blast, the main source of heat being the gas.

The ore should be screened and only the coarse ore charged in the stack, the fines being introduced into the reverberatory hearth of the furnace at intervals through the opening J or through a door at the side. During the charging of fine ore the blast on the furnace and on the generator are both reduced to a point where the natural draft of the stack will prevent fire bursting from this charging door or opening. The hearth is soon filled with molten matter up to the level of the slag-tap, which is left open, and the slag is allowed to run through a raised spout, which traps the blast until the accumulation of matte or metal requires tapping from the lower tap-hole.

This form of furnace allows a much better opportunity for matte or metal to settle out of the slag than is possible in any form of settler or forehearth. The slag is held at the highest temperature while this settling is accomplished. It is therefore practicable to make clean slags when they are so silicious as to flow but slowly from the ordinary furnace or so high in specific gravity that the matte or metal settles slowly. The use of the outside settler is therefore unnecessary in ordinary cases.

Owing to the means provided for introducing fine ores and the screening out of all fine material from the ore charged in the stack, smelting in our furnace makes practically no flue-dust.

By our method of smelting in the described furnace by means of a gas-flame forced into the base of a stack and means of introducing air through twyers in the stack itself or into the flue or hearth leading to the stack it is possible to regulate the action within the furnace by admitting the proper quantity of air at the proper place, so as to produce a reducing effect where a deoxidation or reduction of oxid ores is required or an oxidizing effect where the oxidation of any element in the charge is desirable.

The twyers or air-inlets through the jackets at the base of the stack supply air for the combustion of the gas as it passes up the stack and for the combustion of the fuel fed with the ore. The twyers in the hearth or flue supply air for combustion of the gas or any portion of it before it reaches the stack. An oxidizing-flame is thus produced with an excess of air or a reducing-flame with a limited quantity. The fuel fed with the ore assists with the smelting, but is not required in proportion sufficient to smelt the charge, nor is it required to be of a character or quality necessary to produce a smelting heat, soft coal or wood being sufficient. Some classes of ore not tending to agglomerate would require no fuel in the stack.

While the form of gas-generator herein shown is the best now known to us, it will be understood that we do not wish to be confined to that construction.

We claim—

The combination with a gas-generating furnace, of a smelting-stack, a reverberatory hearth connecting the furnace to the bottom of the stack, means for supplying the hearth with a blast of air and means for mixing fine ores with said blast.

WILLIAM H. ADAMS.
FREDERICK POWELL.

Witnesses:
 ZERA SNOW,
 D. L. BRENNAN.